(12) United States Patent
McCloy et al.

(10) Patent No.: US 10,648,376 B2
(45) Date of Patent: May 12, 2020

(54) PRELOADED TORSIONAL BIASING DEVICE

(71) Applicant: BorgWarner Inc., Auburn Hills, MI (US)

(72) Inventors: Chad McCloy, Cortland, NY (US); Joshua D. Plumeau, Groton, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 0 days.

(21) Appl. No.: 16/357,514

(22) Filed: Mar. 19, 2019

(65) Prior Publication Data

US 2019/0292953 A1 Sep. 26, 2019

Related U.S. Application Data

(60) Provisional application No. 62/645,843, filed on Mar. 21, 2018.

(51) Int. Cl.
| F01L 1/344 | (2006.01) |
| F01L 1/46 | (2006.01) |
| F01L 3/10 | (2006.01) |
| F16F 1/14 | (2006.01) |

(52) U.S. Cl.
CPC .............. *F01L 1/462* (2013.01); *F01L 1/3442* (2013.01); *F01L 3/10* (2013.01); *F16F 1/14* (2013.01); *F01L 2001/34483* (2013.01); *F16F 2236/08* (2013.01); *F16F 2238/024* (2013.01)

(58) Field of Classification Search
CPC . F01L 2001/0475; F01L 1/344; F01L 1/3442; F01L 2001/34463; F01L 2001/34483; F01L 1/352; F01L 1/46; F01L 2013/103; F01L 2820/032; F16F 1/14
USPC ................................ 123/90.15, 90.17, 90.65
See application file for complete search history.

(56) References Cited

U.S. PATENT DOCUMENTS

| 2008/0078341 A1* | 4/2008 | Akasaka ............. F01L 13/0021 123/90.11 |
| 2009/0235884 A1* | 9/2009 | Fischer ................. F01L 1/3442 123/90.17 |

* cited by examiner

Primary Examiner — Jorge L Leon, Jr.
(74) Attorney, Agent, or Firm — Reising Ethington P.C.

(57) ABSTRACT

A biasing assembly used with a VCT device includes a torsional biasing element that is elongated and configured to engage and receive rotational motion from one of a rotor or stator of the VCT device; a rigid element that is configured to engage the other of the rotor of the stator of the VCT device and be inserted within a cavity of a camshaft with the torsional biasing element; a receiving feature that couples the rigid element to the torsional biasing element and inhibits angular movement of the rotor and the stator away from a default angular position, wherein the torsional biasing element and the rigid element are angularly displaced from a resting position to a pre-loaded position when the torsional biasing element and the rigid element engage the rotor and the stator.

20 Claims, 2 Drawing Sheets

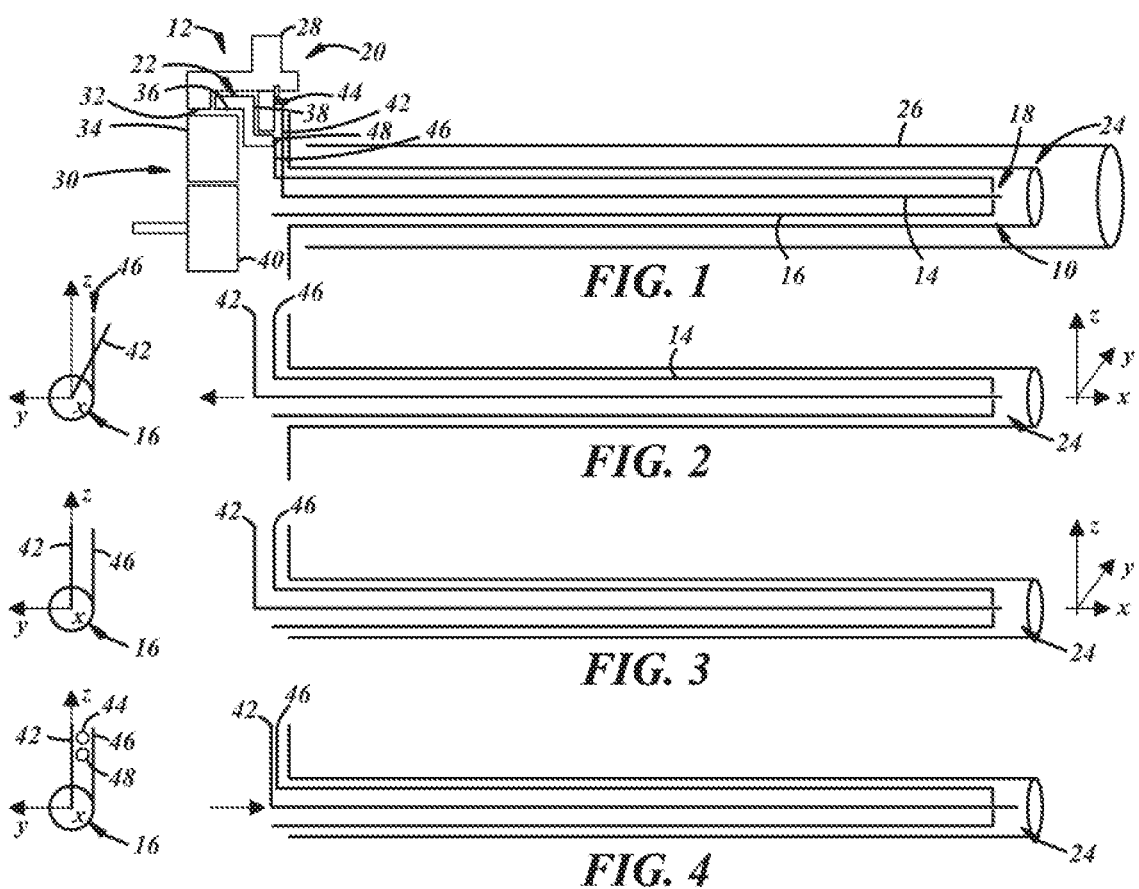

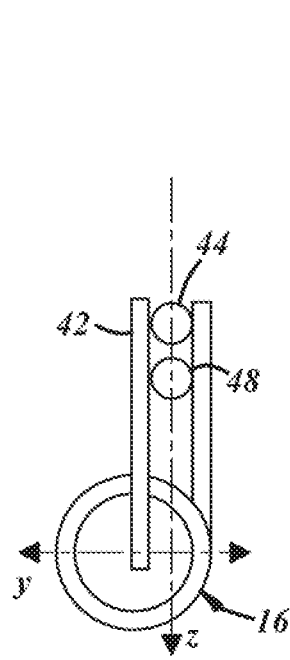
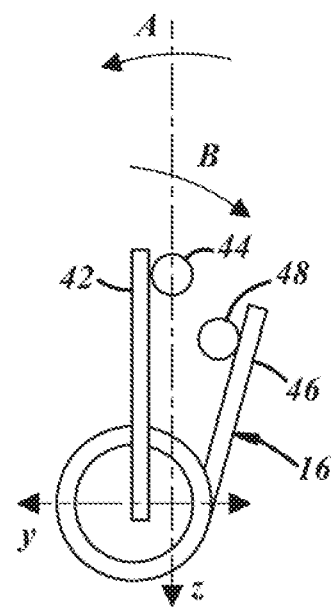
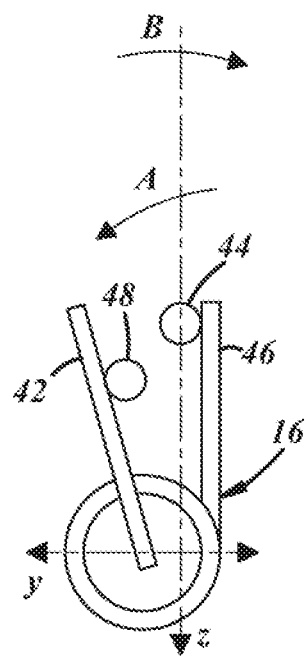
FIG. 5  FIG. 6  FIG. 7
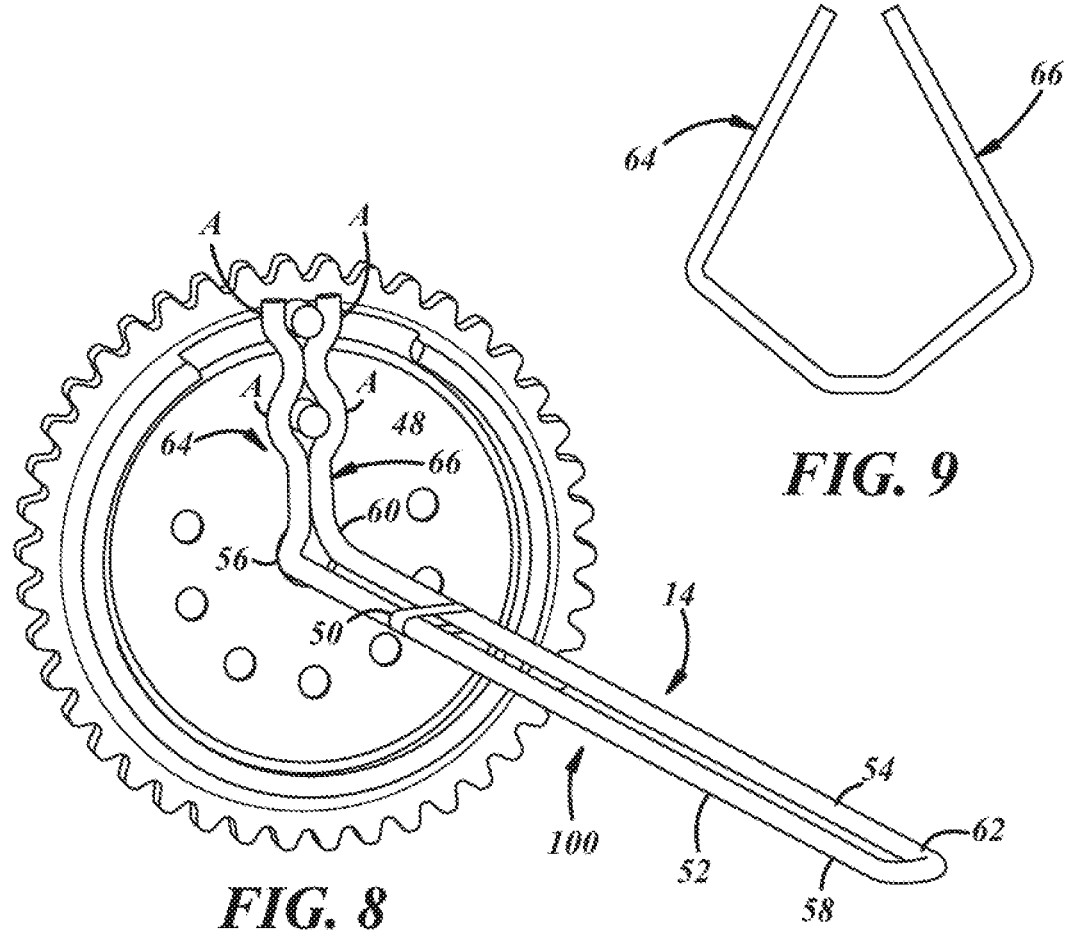
FIG. 8  FIG. 9

PRELOADED TORSIONAL BIASING DEVICE

CROSS-REFERENCE TO RELATED APPLICATIONS

This application claims the benefit of U.S. Patent Application No. 62/645,843 filed on Mar. 21, 2018, the disclosure of which is herein incorporated by reference in its entirety.

TECHNICAL FIELD

The present application relates to variable valve timing (VVT) and, more particularly, to variable camshaft timing (VCT).

BACKGROUND

In the past, the angular position of a camshaft was fixed relative to the angular position of a crankshaft via an endless loop, such as a timing chain. However, VCT is increasingly used with internal combustion engines (ICEs) and can selectively vary the angular position of the camshaft relative to the crankshaft. There are a variety of different ways to vary the angular position of camshafts relative to a crankshaft. For example, VCT can be implemented using hydraulically- or electrically-actuated camshaft phasers that permit angular displacement of the camshaft relative to a crankshaft by a defined amount, which can be referred to as a range of authority. In modern vehicles, the range of authority can be significant. While the increased range can help improve the operating performance of the ICE, the ICE may not operate efficiently if the angular position of the camshaft unintentionally remains in an advanced or retarded position relative to the crankshaft. VCT devices, sometimes referred to as camshaft phasers, are designed to prevent this condition by locking the VCT device so that the angular position of the camshaft is fixed at a mid-position, neither advanced nor retarded, relative to the crankshaft. However, it would be helpful to include a feature with a VCT device that helps the camshaft return to a mid-position without rigidly locking a rotor and a stator.

SUMMARY

In one implementation, a biasing assembly used with a VCT device includes a torsional biasing element that is elongated and configured to engage and receive rotational motion from one of a rotor or stator of the VCT device; a rigid element that is configured to engage the other of the rotor or the stator of the VCT device and be inserted within a cavity of a camshaft with the torsional biasing element; a receiving feature that couples the rigid element to the torsional biasing element and inhibits angular movement of the rotor and the stator away from a default angular position, wherein the torsional biasing element and the rigid element are angularly displaced from a resting position to a pre-loaded position when the torsional biasing element and the rigid element engage the rotor and the stator.

In another implementation, a biasing assembly used with a VCT device includes a torsional biasing element that is elongated and configured to engage and receive rotational motion from one of a rotor or stator of a VCT device; a torque tube, having an inner surface and an outer surface, that is: configured to engage the other of the rotor or the stator of the VCT device, receive the torsional biasing element radially inwardly from the inner surface, and be inserted within a cavity of a camshaft; a receiving feature, carried by the torque tube, that engages a portion of the torsional biasing element and inhibits angular movement of the rotor or the stator away from a default angular position, wherein the torsional biasing element and the torque tube are angularly displaced relative to each other from a resting position to a pre-loaded position when the torsional biasing element and the tubular actuator engage the rotor and the stator of the VCT device.

In yet another implementation, a biasing assembly used with a VCT device includes a torsional biasing element having: a first elongated torsional biasing member including a first camshaft end and a first distal end; a second elongated torsional biasing member, spaced apart from the first elongated torsional biasing member, including a second camshaft end and a second distal end, wherein the first elongated torsional biasing member is coupled with the second elongated torsional biasing member; a first input member coupled to the first camshaft end of the first elongated torsional biasing member; and a second input member coupled to the second camshaft end of the second elongated torsional biasing member, wherein the first input member and the second input member are angularly displaced relative to each other from a resting position to a pre-loaded position when the first input member and the second input member engage a rotor and a stator of the VCT device.

BRIEF DESCRIPTION OF THE DRAWINGS

FIG. 1 is a profile cross-sectional view depicting an implementation of a torsional biasing assembly and a portion of a VCT device;

FIG. 2 includes profile cross-sectional views depicting an implementation of a torsional biasing assembly;

FIG. 3 includes profile cross-sectional views depicting an implementation of a torsional biasing assembly;

FIG. 4 includes profile cross-sectional views depicting an implementation of a torsional biasing assembly;

FIG. 5 is a profile cross-sectional view depicting an implementation of a torsional biasing assembly;

FIG. 6 is a profile cross-sectional view depicting an implementation of a torsional biasing assembly;

FIG. 7 is a profile cross-sectional view depicting an implementation of a torsional biasing assembly;

FIG. 8 is a perspective view depicting another implementation of a torsional biasing assembly; and FIG. 9 is a profile cross-sectional view depicting an implementation of a torsional biasing assembly.

DETAILED DESCRIPTION

A biasing assembly used with a variable camshaft timing (VCT) device helps orient an angular position of a rotor of the device relative to a stator of the device in a mid-position that neither advances nor retards timing of the camshaft relative to the crankshaft and can do so when an actuator for the VCT device is not functional. The biasing assembly includes a torsional biasing element that is elongated and receives rotational force from a rotor or stator of a VCT device. A rigid element is coupled to the torsional biasing element and engages the other of the rotor or stator of the VCT device. The rigid element and the torsional biasing element can be inserted within a cavity of a camshaft such that these elements can rotate freely with respect to the camshaft. A receiving feature can couple the rigid element to the torsional biasing element and inhibit angular movement of the rotor and the stator away from a default angular position. The default angular position can be the mid-position of the VCT device e.g., (camshaft phaser) that is neither advanced nor retarded.

The VCT device changes the phase of the rotor relative to the stator. In one implementation, the rotor can be directly coupled to the torsional biasing element and the stator can be indirectly coupled to the torsional biasing element through the rigid element. As the angular position of the camshaft is advanced (moved in one angular direction), the rotor directly imparts rotational force on one end of the torsional biasing element, which is fixed relative to the rigid element by the receiving feature. The torsional biasing element, such as a torsion spring that is twisted or torqued, resists the rotational force and urges the rotor to return to the default angular position. And when the angular position of the camshaft is retarded (moved in another angular direction), the stator can indirectly impart rotational force on another end of the torsional biasing element. The torsional biasing element resists the rotational force of the stator moving in a different angular direction and urges the stator to return to the default angular position. Applying rotational force to one end of the torsional biasing element in one rotational direction and rotational force to another end of the torsional biasing element in another rotational direction torques the biasing element in the same rotational direction despite the application of rotational force on the torsional biasing element in opposite rotational directions. However, it should be appreciated that in other implementations it is possible to couple the stator directly to the torsional biasing element and indirectly couple the rotor to the torsional biasing element through the rigid element.

The coupled torsional biasing element and the rigid element exist in a resting position when separated from the VCT device. Before installation such that the torsional biasing element and the rigid element engage the rotor and the stator, the torsional biasing element and the rigid element are angularly displaced relative to each other from the resting position to a pre-loaded position. When the torsional biasing element and the rigid element engage the rotor and the stator of the VCT device in a pre-loaded position, the elements can exert a positive rotational spring force on both the rotor and the stator. Without a pre-load, the torsional biasing element may not be able to accurately move the rotor and stator to a default position.

Turning to FIG. 1, an implementation of a biasing assembly 10 used with a VCT device 12 is shown. The biasing assembly 10 includes a torsional biasing element 14 and a rigid element 16 that is coupled to the torsional biasing element 14 using a receiving feature 18. The rigid element 16 is implemented as a torque tube that engages a stator 20 of the VCT device 12 and the torsional biasing element 14 engages a rotor 22 of the VCT device 12. The biasing assembly 10, including the rigid element 16 and the torsional biasing element 14, can be received within a cavity 24 of the camshaft 26. Biasing assemblies can be used with different implementations of VCT devices, also referred to as camshaft phasers, including those that are electrically-actuated as well as those that are hydraulically-actuated. To provide context, one example of an electrically-actuated camshaft phaser is described in U.S. application Ser. No. 15/507,526, the contents of which are incorporated by reference. And an example of a hydraulically-actuated camshaft phaser is described in U.S. application Ser. No. 12/921,425, the contents of which are incorporated by reference. It should be appreciated that the electrically-actuated camshaft phaser described in U.S. application Ser. No. 15/507,526 and the hydraulically-actuated camshaft phaser described in U.S. application Ser. No. 12/921,425 are examples of VCT devices that can be used with the biasing assembly but many other different implementations of VCT devices are possible.

The implementation shown in FIG. 1 will be described with respect to an electrically-actuated camshaft phaser having a sprocket 28, a planetary gear assembly 30, and a plurality of ring gears. The sprocket 28 can include gear teeth that extend radially outwardly to engage an endless loop (not shown), such as a timing chain, that also loops around a crankshaft sprocket (not shown) attached to a distal end of a crankshaft (not shown). A first ring gear 32 is also included with the sprocket 28 and comprises a plurality of radially-inwardly facing gear teeth that engage a plurality of planet gears 34. A second ring gear 36 is coupled to the camshaft 26 and comprises a plurality of radially-inwardly facing gear teeth. In this implementation, the second ring gear 36 is included with an inner plate 38 that couples with the camshaft 26. A sun gear 40 having radially-outwardly facing gear teeth engages the planetary gear assembly 30. The sun gear 40 can be rotated at the same angular velocity as the camshaft 26 to maintain an angular position of the camshaft 26 relative to the crankshaft. As the sun gear 40 rotates at the same angular velocity as the camshaft 26, the sun gear 40, the planetary gear assembly 30, the first ring gear 32, and the second ring gear 36 do not move relative to each other. However, the sun gear 40 can be rotated at an angular velocity that is greater or less than the angular velocity of the camshaft 26 to change the angular position of the camshaft 26 relative to the crankshaft. The first ring gear 32 has a different number of gear teeth than the second ring gear 36 so when the sun gear 40 rotates and imparts that rotation on the planetary gears 34, the planetary gears 34 rotate and the first ring gear 32 is displaced relative to the second ring gear 36. In this embodiment, the sprocket/first ring gear 28, 32 acts as the stator 20 and the inner plate/second ring gear 36, 38 that are coupled to the camshaft 26 act as the rotor 22.

The torsional biasing element 14 engages the sprocket 28 and the inner plate 38 engages the torque tube 16 or the element 14 engages the inner plate 38 and the tube 16 engages the sprocket 28 depending on whether the camshaft phaser is adjusted to advance or retard timing. A first input member 42 can extend substantially perpendicularly from the torsional biasing element 14 to engage a sprocket pin 44 fixed to a radial surface of the sprocket 28. The first input member 42 can transmit rotational force between the sprocket 28 and the torsional biasing element 14. A second input member 46 can extend substantially perpendicularly from the torque tube 16 to engage an inner plate pin 48 fixed to a radial surface of the inner plate 38. The second input member 46 can transmit rotational force between the inner plate 38 and the torque tube 16. The receiving feature 18 is included at one end of the torque tube 16 for coupling the torque tube 16 with the torsional biasing element 14 to inhibit angular displacement between these elements. In one implementation, the receiving feature 18 can be a splined aperture in an end of the torque tube 16 that permits axial movement of the torsional biasing element 14 but inhibits the angular displacement of the torsional biasing element 14 relative to the torque tube 16. The torque tube 16 implementing the rigid element can be designed and formed from a material to maintain its shape such that the torque tube 16 resists the torsional forces or torque applied by the torsional biasing element 14. In one embodiment, the torque tube 16 can be formed from metal that has an inner diameter and outer diameter sized to maintain its dimension despite the torque exerted on the torque tube 16 from the torsional biasing element 14 through the receiving feature 18. The torsional biasing member 14 can be positioned radially-inwardly from the inner surface of the torque tube 16.

The torsional biasing element 14 can be elongated and formed from a metal having particular dimensions that correspond to a level of torque resistance when twisted or a torque is applied. In one implementation, the torsional biasing element 14 can be a solid wire having a diameter of 4 millimeters (mm). The torque generated by the torsional biasing element 14 having such a diameter can be 8 newton-meters (Nm). That is, the torsional biasing element 14 can be designed to rotationally twist or deflect such that a change in angular position of the first input member 42 or the second input member 46 is met with a corresponding rotational resistance force supplied by the element 14. The camshaft 26 includes the cavity 26 that receives the torsional biasing element 14 and the torque tube 16. When the biasing assembly 10 is combined with a VCT device 12, the first input member 42 can engage the sprocket pin 44, the second input member 46 can engage the inner plate pin 48, and as the camshaft 26 is coupled with the inner plate 38, the torsional biasing element 14 and the torque tube 16 are received within the cavity 28 of the camshaft 26.

FIGS. 2-4 depict cross-sectional profile diagrams of the first input member 42 attached to the torsional biasing element 14 and engaging the sprocket pin 44 as well as the second input member 46 attached to the torque tube 16 and engaging the inner plate pin 48. The torque tube 16 is shown in the camshaft cavity 24. FIG. 2, includes views of the torsional biasing element 14 and the torque tube 16 in a resting position before a pre-load is applied. The torsional biasing element 14 is shown to be inserted into the receiving feature 18 of the torque tube 16. The receiving feature 18 can include elements that allow axial movement of the torsional biasing element 14 relative to the torque tube 16 but resist rotational movement of the torsional biasing element 14 relative to the torque tube 16. These elements can be splines as discussed above. In the resting position, the first input member 42 is oriented in an angular position 115011 that is not parallel to the second input member 46. Turning to FIG. 3, the torsional biasing element 14 and the torque tube 16 are shown in a pre-loaded position in which the torsional biasing element 14 has been angularly displaced or rotated relative to the torque tube 16. In the pre-loaded position, the first input member 42 is parallel to the second input member 46. And before the first input member 42 engages the sprocket pin 44 and the second input member 46 engages the inner plate pin 48, the torsional biasing member is moved axially with respect to the torque tube 16 while in a preloaded position so that the first input member 42 and the second input member 46 are aligned in the YZ plane as is shown in FIG. 4. While the camshaft phaser is adjusted to a mid-position, the first input member 42 and the second input member 46 can each engage the sprocket pin 44 and the inner plate pin 48 at the same time.

FIGS. 5-7 depict profile diagrams of the first input member 42 attached to the torsional biasing element 14 and engaging the sprocket pin 44 as well as the second input member 46 attached to the torque tube 16 and engaging the inner plate pin 48. FIG. 5 shows the angular position of the first input member 42/torsional biasing element 14 and the angular position of the second input member 46/torque tube 16 when the VCT device 12 has adjusted the angular position of the sprocket 28 and the inner plate 38 so that the camshaft 26 is in a mid-position in which the camshaft 26 is neither advanced or retarded. In the mid-position, the first input member 42 and the second input member 46 can be substantially parallel to each other. When the VCT device 12 adjusts the angular position of the inner plate 38 relative to the angular position of the sprocket 28, the angular position of the camshaft 26 can be advanced or retarded relative to the crankshaft which is shown with respect to FIG. 6-7. When changing the angular position of the camshaft 26 relative to the crankshaft such that timing is advanced, the inner plate 38 changes angular position and moves in rotational direction B. The second input member 46 exerts a rotational force opposing the movement of the inner plate 38 in direction B through the inner plate pin 48. When changing the angular position of the camshaft 26 relative to the crankshaft such that timing is retarded, the inner plate 38 changes angular position and moves in rotational direction A. The first input member 42 exerts a rotational force opposing the movement of the inner plate 38 in direction A through the inner plate pin 48. The rotational force is created by the twisting of the torsional biasing element.

Another implementation of the biasing assembly is shown in FIG. 8. The biasing assembly 100 can be formed from a unitary structure or element and a link 50 that limits movement of a first elongated torsional biasing member relative to a second elongated torsional biasing member 54. FIG. 8 depicts the biasing assembly 100 engaging the sprocket pin 44 carried by a radial side of the sprocket 28 and the inner plate pin 48 carried by the inner plate 38, which is configured to couple to the camshaft 26. In this implementation, the biasing assembly 100 can be formed from an uninterrupted section of solid metal wire that is formed into a defined shape and combined with the link 50 to form the biasing assembly 100.

The torsional biasing element 14 includes the first elongated torsional biasing member 52 including a first camshaft end 56 and a first distal end 58. The second elongated torsional biasing member 54 that is spaced apart and possibly parallel from the first elongated torsional biasing member 52 includes a second camshaft end 60 and a second distal end 62. The first elongated torsional biasing member 52 can be coupled with the second elongated torsional biasing member 54 as they are collectively formed from one element, such as the solid metal wire. A first input member 64 is coupled to the first camshaft end 56 of the first elongated torsional biasing member 52 and a second input member 66 is coupled to the second camshaft end 60 of the second elongated torsional biasing member 54.

In one implementation, a straight and solid metal wire section including two ends is bent at a first end and a second end to form the first input member 64 and the second input member 66, respectively. The resulting wire can then be folded in half to form the first elongated torsional biasing member 52 and the second elongated torsional biasing member 54. And the first input member 64 and the second input member 66 can be curved at axial locations (A) where the first input member 64 and the second input member 66 engage the pins 44, 48 of the sprocket 28 and the inner plate 38. The first input member 64 can be angularly displaced relative to the second input member 66 such that these members are not parallel to each other and are oriented at an acute angle relative to each other. This can be referred to as the resting position. Later, when the torsional biasing member 14 will be configured to engage the pins 44, 48 of the sprocket 28 and the inner plate 38, the first input member 64 and the second input member 68 are angularly displaced relative to each other from the resting position to a pre-loaded position so that the first input member 64 and the second input member 68 engage the pins 44, 48 of the sprocket 28 and the inner plate 38 of the VCT device 12. The pre-loaded position can have the first input member 64 substantially parallel with the second input member 66. The sprocket 28 and the inner plate 38 engaged by the biasing member 100 can move as is described above with respect to FIGS. 5-7.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A biasing assembly used with a variable camshaft timing (VCT) device, the biasing assembly comprising:
    a torsional biasing wire that is elongated and configured to engage and receive rotational motion from one of a rotor or stator of the VCT device;
    a torque tube that is configured to engage a remaining one of the rotor or the stator and be inserted within a cavity of a camshaft with the torsional biasing wire;
    an aperture that couples the torque tube rigid-element to the torsional biasing wire and inhibits angular movement of the rotor and the stator away from a default angular position,
    wherein the torsional biasing wire and the torque tube are angularly displaced from a resting position to a pre-loaded position when the torsional biasing wire and the torque tube engage the rotor and the stator.

2. The biasing assembly recited in claim 1, wherein angular movement of the rotor in a first direction and angular movement of the stator in a second direction torques the torsional biasing wire one of the first direction or the second direction.

3. The biasing assembly recited in claim 1, wherein the rotor is coupled to the camshaft and the stator comprises a sprocket.

4. The biasing assembly recited in claim 1, wherein the aperture permits axial movement of the torsional biasing wire relative to the aperture and inhibits rotational movement of the torsional biasing wire relative to the aperture.

5. The biasing assembly recited in claim 1, further comprising curved wire portions configured to engage the rotor and the stator.

6. The biasing assembly recited in claim 1, wherein the VCT device is hydraulically-actuated.

7. The biasing assembly recited in claim 1, wherein the VCT device is electrically-actuated.

8. A biasing assembly used with a variable camshaft timing (VCT) device, the biasing assembly comprising:
    a torsional biasing wire that is elongated and configured to engage and receive rotational motion from one of a rotor or stator of a VCT device;
    a torque tube, having an inner surface and an outer surface, that is configured to: engage a remaining one of the rotor or the stator, receive the torsional biasing wire radially inwardly from the inner surface, and be inserted within a cavity of a camshaft;
    an aperture, carried by the torque tube, that engages a portion of the torsional biasing wire and inhibits angular movement of the rotor or the stator away from a default angular position,
    wherein the torsional biasing wire element and the torque tube are angularly displaced relative to each other from a resting position to a pre-loaded position when the torsional biasing wire and the torque tube engage the rotor and the stator.

9. The biasing assembly recited in claim 8, wherein angular movement of the rotor in a first direction and angular movement of the stator in a second direction torques the torsional biasing element in one of the first direction or the second direction.

10. The biasing assembly recited in claim 8, wherein the rotor is coupled to the camshaft and the stator comprises a sprocket.

11. The biasing assembly recited in claim 8, wherein the aperture permits axial movement of the torsional biasing wire relative to the aperture and inhibits the rotational movement of the torsional biasing wire relative to the aperture.

12. The biasing assembly recited in claim 8, further comprising curved wire portions configured to engage the rotor and the stator.

13. The biasing assembly recited in claim 8, wherein the VCT device is hydraulically-actuated.

14. The biasing assembly recited in claim 8, wherein the VCT device is electrically-actuated.

15. A biasing assembly used with a variable camshaft timing (VCT) device, the biasing assembly comprising:
    a torsional biasing wire including:
        a first elongated torsional biasing member including a first camshaft end and a first distal end;
        a second elongated torsional biasing member, spaced apart from the first elongated torsional biasing member, including a second camshaft end and a second distal end, wherein the first elongated torsional biasing member is coupled with the second elongated torsional biasing member;
        a first input member coupled to the first camshaft end of the first elongated torsional biasing member; and
        a second input member coupled to the second camshaft end of the second elongated torsional biasing member,
    wherein the first input member and the second input member are angularly displaced relative to each other from a resting position to a pre-loaded position when the first input member and the second input member engage a rotor and a stator of the VCT device.

16. The biasing assembly recited in claim 15, wherein the first elongated torsional biasing member, the second elongated torsional biasing member, the first input member, and the second input member are formed from a unitary structure.

17. The biasing assembly recited in claim 16, wherein the unitary structure is a solid metal wire.

18. The biasing assembly recited in claim 15, wherein the first input member and the second input member include curved wire portions configured to engage the rotor and the stator.

19. The biasing assembly recited in claim 15, further comprising a link that limits movement of the first elongated torsional biasing member relative to the second elongated torsional biasing member.

20. The biasing assembly recited in claim 15, wherein the VCT device is electrically-actuated.

* * * * *